United States Patent
Chan

(10) Patent No.: US 7,039,117 B2
(45) Date of Patent: May 2, 2006

(54) ERROR CONCEALMENT OF VIDEO DATA USING TEXTURE DATA RECOVERY

(75) Inventor: Joseph C. Chan, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 537 days.

(21) Appl. No.: 09/932,127

(22) Filed: Aug. 16, 2001

(65) Prior Publication Data

US 2003/0035487 A1    Feb. 20, 2003

(51) Int. Cl.
*H04N 7/12* (2006.01)
(52) U.S. Cl. .................................. 375/240.27
(58) Field of Classification Search ................ 348/616, 348/699; 372/240.12–240.16, 240.23–240.28; 714/751, 747; 382/275; H04N 7/12, 7/32
See application file for complete search history.

(56) References Cited

U.S. PATENT DOCUMENTS

| | | | | |
|---|---|---|---|---|
| 5,247,363 A | * | 9/1993 | Sun et al. | 348/616 |
| 5,442,400 A | * | 8/1995 | Sun et al. | 375/240.15 |
| 5,724,369 A | * | 3/1998 | Brailean et al. | 714/747 |
| 6,111,916 A | * | 8/2000 | Talluri et al. | 375/240.23 |
| 6,175,597 B1 | * | 1/2001 | Ozcelik et al. | 375/240.27 |
| 6,357,028 B1 | * | 3/2002 | Zhu | 714/751 |
| 6,493,392 B1 | * | 12/2002 | Chung et al. | 375/240.27 |
| 6,665,345 B1 | * | 12/2003 | Sekiguchi et al. | 375/240.25 |
| 6,697,126 B1 | * | 2/2004 | Moni et al. | 382/275 |
| 6,700,934 B1 | * | 3/2004 | Lin | 375/240.16 |
| 2001/0040926 A1 | * | 11/2001 | Hannuksela et al. | 375/240.27 |
| 2003/0012286 A1 | * | 1/2003 | Ishtiaq et al. | 375/240.24 |
| 2003/0012287 A1 | * | 1/2003 | Katsavounidis et al. | 375/240.27 |
| 2003/0067981 A1 | * | 4/2003 | Zhao et al. | 375/240.16 |

* cited by examiner

Primary Examiner—Richard Lee
(74) Attorney, Agent, or Firm—John L. Rogitz

(57) ABSTRACT

A method for concealing errors in texture partition of a video packet is described. The method includes determining a particular macroblock within the texture partition where error is detected, concealing the error starting at the particular macroblock, and evaluating image smoothness of concealed macroblocks. The concealing and evaluating are repeated with one more macroblock added prior to the previous particular macroblock. The concealing and evaluating are repeated until all macroblocks in the texture partition have been concealed. A set of macroblocks, including a combination of decoded and concealed macroblocks, that produces best image smoothness is then selected to replace the corrupted texture partition.

26 Claims, 5 Drawing Sheets

ERROR CONCEALMENT OF VIDEO DATA USING TEXTURE DATA RECOVERY

BACKGROUND

The present invention relates to error concealment, and more particularly, to concealing errors in texture partition of a video packet.

In an MPEG-4 decoder used for real-time streaming, when an error is detected in the texture partition of a video packet, substantially all decoded texture information of that packet is often discarded. In video data, texture represents luminance and chrominance information of the pixels in the frame. The region of the video frame corresponding to this corrupted packet may then be generated by error correction process. However, traditional error detection and correction systems may require a significant amount of overhead as well as significant amount of data processing when decoding coded video bit stream signals. Thus, current video decoding systems may rely on error concealment techniques for effective video streaming. In contrast to error correction, which attempts to reconstruct lost or corrupt data, error concealment aims to generate data that may be substituted for the lost or corrupt data. Discrepancies in image created by the generated data (generally at the macroblock level) are not likely to be perceived by a viewer of a video image that utilizes such error concealment.

Motion compensated temporal replacement may be an appropriate error concealment technique in video frames without much scene changes. This technique uses motion information to propagate macroblocks of the texture data from the previous frame to replace the texture data of the corrupted macroblocks in the current frame. Thus, this technique may provide effective error concealment as long as motion information can be obtained without much error. However, there are times when the texture data cannot be adequately concealed just by copying texture data from the previous frame at some motion compensated displacement.

SUMMARY

In one aspect, a method for concealing errors in texture partition of a video packet is described. The method includes determining a particular macroblock within the texture partition where error is detected, concealing the error starting at the particular macroblock, and evaluating image smoothness of concealed macroblocks. The concealing and evaluating are repeated with one more macroblock added prior to the previous particular macroblock. The concealing and evaluating are repeated until all macroblocks in the texture partition have been concealed. A set of macroblocks, including a combination of decoded and concealed macroblocks, that produces best image smoothness is then selected to replace the corrupted texture partition.

In another aspect, an error concealment system for texture partition of a video packet is disclosed. The system includes an error location detector, an error concealment element, an image smoothness evaluator, and a selector. The error location detector receives video packets, and determines a particular macroblock within the texture partition where error is detected. The error concealment element conceals the error starting at the particular macroblock. The image smoothness evaluator evaluates the concealed macroblocks. The selector then selects a set of macroblocks, including a combination of decoded and concealed macroblocks, that produces best image smoothness.

DETAILED DESCRIPTION

In recognition of the above-stated difficulties with the prior error concealment techniques, the present invention describes embodiments for error concealment of video data using texture data recovery. In concealing corrupted video packets, the decoder utilizes uncorrupted received texture information. Macroblock boundary smoothness is evaluated for varying number of macroblocks of utilized texture information. The final number of macroblocks of utilized decoded texture information (the recovered information) is selected to maximize overall boundary smoothness. Although present embodiments are applicable to any video data, they are particularly well suited for MPEG-4 decoders used for real-time streaming video. Consequently for purposes of illustration and not for purposes of limitation, the exemplary embodiments of the invention are described in a manner consistent with such use, though clearly the invention is not so limited.

Figure 1A:
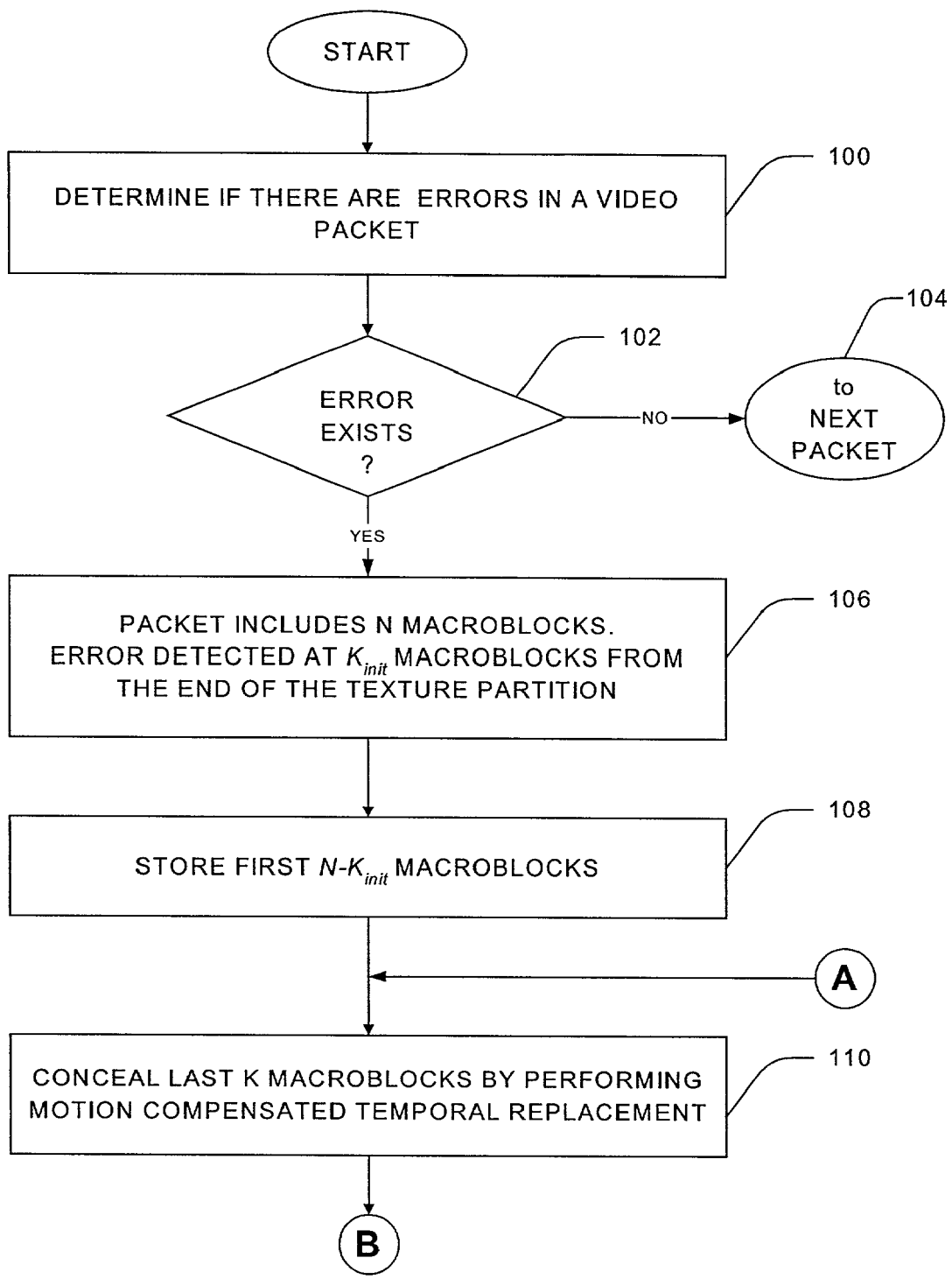
FIGS. 1A through 1B describe the present error concealment technique in accordance with an embodiment of the present invention.
Figure 1B:
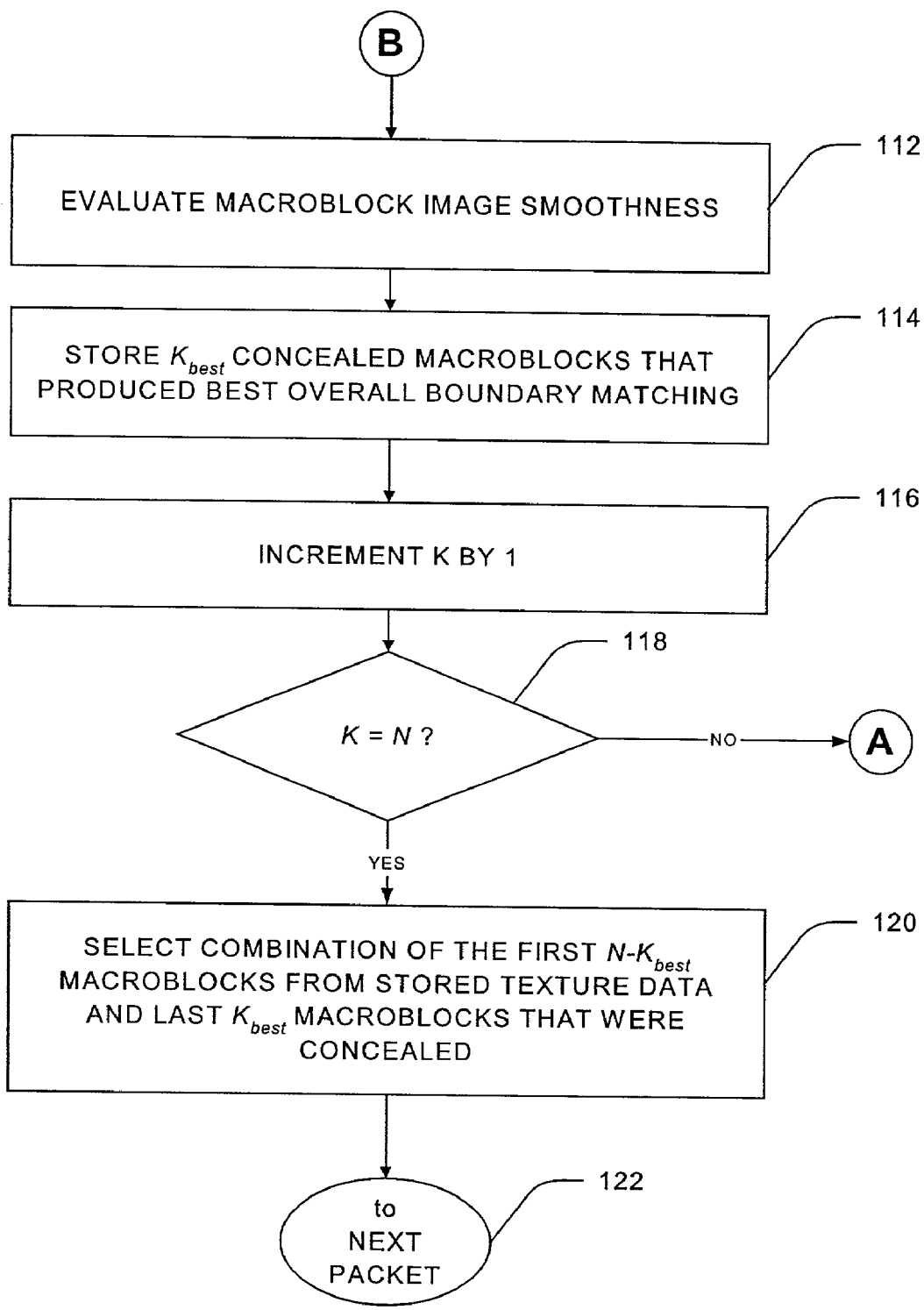

FIGS. 1A through 1B describe the present error concealment technique in accordance with an embodiment of the present invention. The technique is described in a flowchart form.

Figure 2:
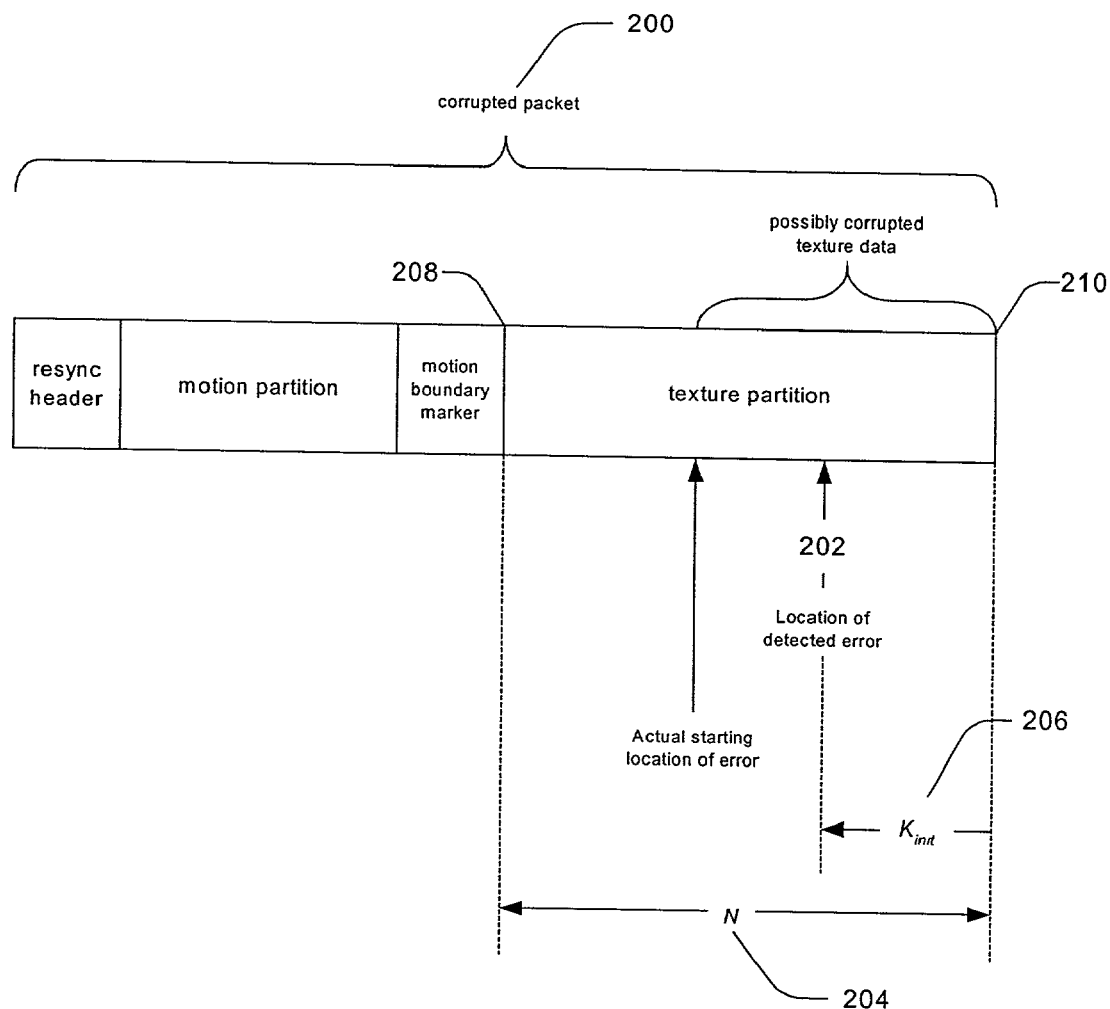
FIG. 2 shows an example of a corrupted video packet with relevant parameters designated on the packet.

In the illustrated embodiment, determination is made (at 100) as to the presence of any errors in the texture partition of a video packet. Detecting invalid variable length code (VLC), inconsistent resynchronization header information, and/or receipt of out-of-range motion vectors and other related invalid codes may determine video packet errors. Since variable length codes are used to compress video data, the location where the decoder detects an error (e.g. where invalid VLC occur) may be some undetermined number of bits away from the actual location of the error. Accordingly, if the error is detected at 102, then the video packet may be further processed at 106. Otherwise if no error is detected at 102, then the next video packet may be processed at 104. FIG. 2 shows an example of a corrupted video packet 200.

In video data encoded in Moving Picture Experts Group (MPEG) format, a video frame is divided into macroblocks. In this format, each video packet includes information for consecutive macroblocks from left to right and top to bottom. The number of macroblocks (N) represented by each video packet may be determined by the change in macroblock number field of the video packet header. Thus, packet processing (at 106) may include determining the location of the detected error 202 with respect to the total number of macroblocks (N) 204. This error location determination may be made as occurring at a particular macroblock (K) 206 from the end of the texture partition 210. Alternatively, the error location may be determined to occur at N-K macroblocks from the beginning of the texture partition 208. Therefore, an assumption may be made that the texture information is corrupted starting from the location of the detected error 202. Accordingly, K is initialized to the number of macroblocks in the packet that was decoded after the first detected error of the packet. This initial value of K (i.e. $K_{init}$) 206 is the least number of macroblocks that is concealed.

Since N-$K_{init}$ is the largest number of macroblocks to be decoded but not concealed, the texture information of the first N-$K_{init}$ decoded macroblocks is stored in a temporary buffer, at 108, to be used later in selecting a set of texture data with the best boundary smoothness measure. Further, the last K macroblocks of the texture data is error concealed, at 110. In the illustrated embodiment of FIG. 1A, the error concealment process, at 110, includes motion compensated temporal replacement. This may involve concealing the corrupted texture data with motion compensated texture data from the previous frame using corresponding motion vectors. To save computation time, motion compensated temporal replacement may only be required on macroblocks whose motion vector has changed. The first N-K macroblocks assumed to have non-corrupted texture information may be considered as "non-corrupted" in the above error concealment process.

In the illustrated embodiment, the image smoothness of the corrupted video packet macroblocks restored by temporal replacement (at 110) may then be evaluated, at 112. The image smoothness may be measured by computing the smoothness of macroblock boundaries in the restored texture data. In one embodiment, this boundary smoothness is measured by summing the pixel value mismatch between macroblock boundary pixels. Thus, this method measures the image smoothness spatially (see FIG. 3). This embodiment is described in detail below in conjunction with description of FIG. 3.

The value of K that produces the best overall boundary matching (i.e. smallest sum of boundary pixel mismatch for all macroblocks of the corrupted video packet) is stored, at 114, as $K_{best}$ for later use. Moreover, by storing the partial sum of the mismatch values (mismatch values for each macroblock) the sum of the mismatch values in each iteration may be computed more efficiently by reusing the partial mismatch values from previous iteration for macroblocks that itself and its neighbors did not change.

At 116, the variable K is incremented by one, which moves the particular point of demarcation between the decoded and the concealed texture data further to the beginning 208 of the texture partition in the video packet. If this particular point of demarcation has not reached the beginning of the motion partition 206 in the video packet (i.e. K≠N), at 118, then the process of error concealing by creating motion compensated temporal replacement and evaluating the image smoothness/matching with one more macroblock of concealed texture data is repeated, starting at 110. Otherwise when K=N, all macroblocks of the texture data have been concealed. Thus when K=N, a combination of recovered decoded texture data and concealed texture data that produced a lowest mismatch value (i.e. best image smoothness at K=$K_{best}$) is selected, at 120. Accordingly, the texture data of the first N-$K_{best}$ macroblocks is restored from the temporary buffer created in 108. The texture data of these N-$K_{best}$ macroblocks is the recovered texture data. The last $K_{best}$ macroblocks then include concealed texture data. Finally, the processing moves to the next video packet, at 122.

Figure 3:
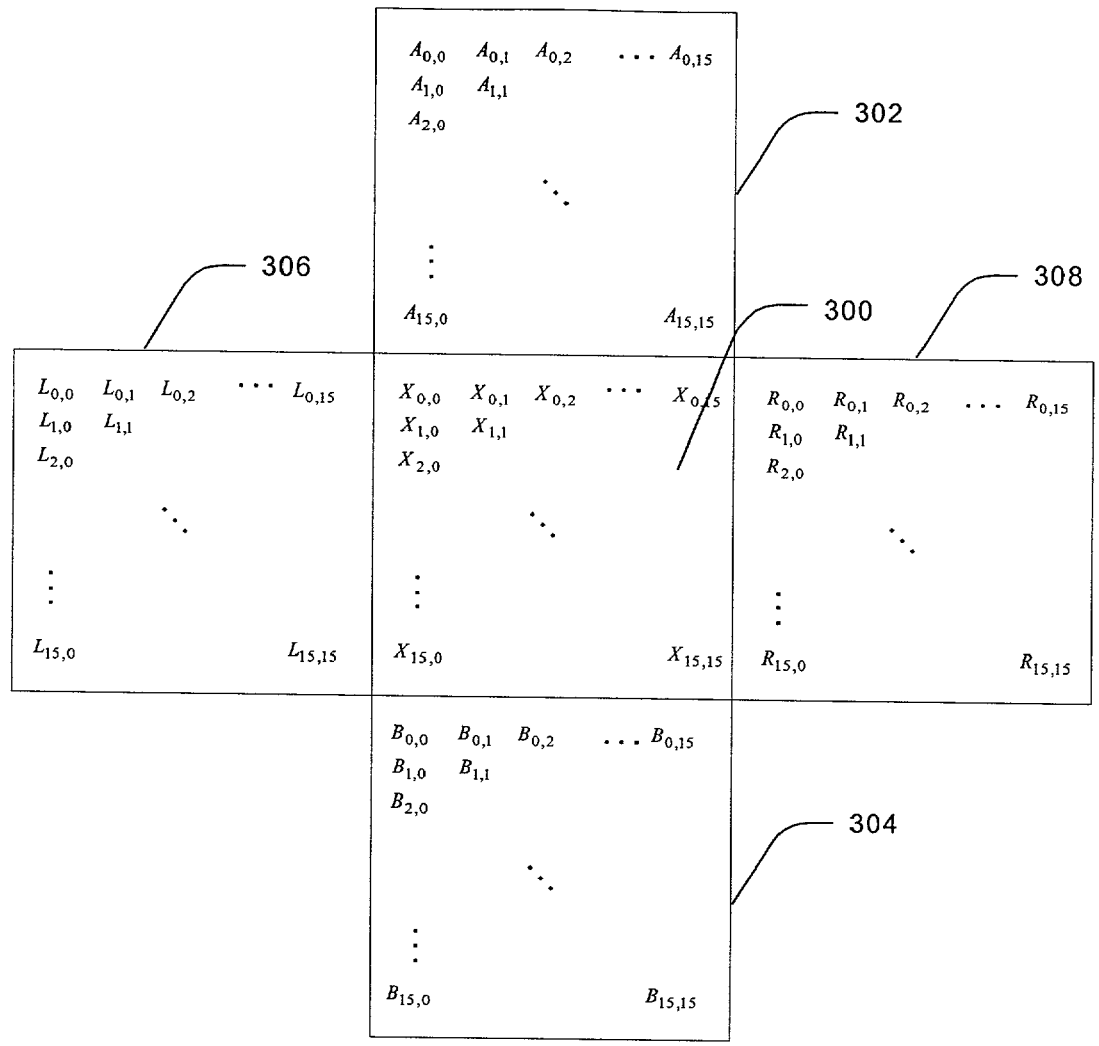
FIG. 3 illustrates an image smoothness test of texture data in accordance with an embodiment of the present invention.

FIG. 3 illustrates an image smoothness test of texture data in accordance with an embodiment of the present invention. The image smoothness of the current macroblock 300 may be evaluated by summing the square of the pixel value mismatch between the current macroblock 300 and the neighboring macroblock 302, 304, 306, 308 boundary pixels. However, other methods, such as root-sum-square or simple difference sum, may be employed to compute the boundary pixel mismatch value. Further, the image smoothness test may be performed with more than one row or column difference of the boundary pixels between neighboring macroblocks.

In the illustrated embodiment, the boundary pixel mismatch value (µ1) of the current macroblock 300 is computed as:

$$\mu 1 = \sum_{i=0}^{15} w_a \cdot (X_{0,i} - A_{15,t})^2 +$$
$$w_b \cdot (X_{15,i} - B_{0,i})^2 + w_l \cdot (X_{t,0} - L_{i,15})^2 + w_r \cdot (X_{t,15} - R_{i,0})^2.$$

The weights $w_a$, $w_b$, $w_l$, and $w_r$ may be used to weigh the boundary mismatch between macroblocks belonging to different video packets differently. Thus, depending on the desired quality of video frames, the boundary mismatch between macroblocks that belong to different video packets may be configured to weigh more than the mismatch between the macroblocks that belong to same video packets.

Figure 4:
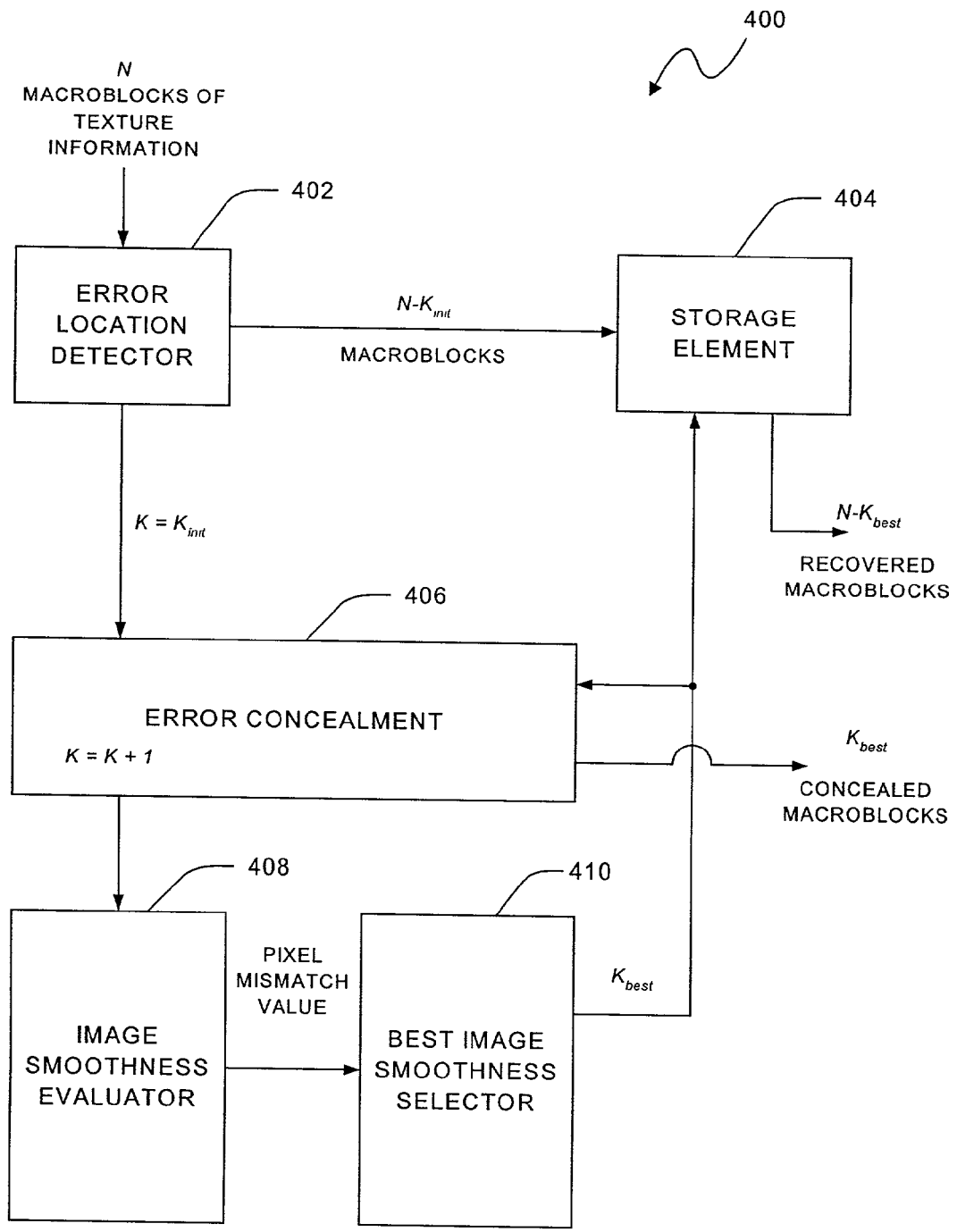
FIG. 4 shows an error concealment system according to an embodiment of the present invention.

An error concealment system 400 according to an embodiment of the present invention is shown in FIG. 4. The system 400 includes an error location detector 402 to receive N macroblocks of texture data, some of which are corrupted. In the illustrated embodiment, the detector 402 is configured to determine the location of a video packet error with respect to the total number of macroblocks (N). The location determination provides the macroblock number ($K_{init}$) from the end 210 of the texture partition. Thus, this determination enables separation of N macroblocks of texture data into N-K recovered macroblocks and K concealed macroblocks.

The N-$K_{init}$ macroblocks are stored in a storage element 404. The first N-$K_{best}$ macroblocks of the N-$K_{init}$ macroblocks are later used, once the value for $K_{best}$ is determined. The last $K_{init}$ macroblocks of the texture data are then sent to an error concealment element 406. In one embodiment, the error concealment element 406 includes a motion compensated temporal replacement element. The temporal replacement element uses motion information to propagate macroblocks of the texture data from the previous frame to replace the texture data of the macroblocks in the current frame. The first N-K macroblocks assumed to have non-corrupted texture information may be considered as "non-corrupted" in the above temporal replacement process.

An image smoothness evaluator 408 then evaluates the image smoothness of the temporally replaced texture data. In the illustrated embodiment, the evaluator 408 measures the smoothness of macroblock boundaries in the restored texture data. Particular implementations of the macroblock boundary test have been described above.

A best image smoothness selector 410 receives a pixel mismatch value from the evaluator 408, and selects texture data that provides best image smoothness. This selection provides a value for $K_{best}$. The selector 410 provides this value to the error concealment element 406 and the storage element 404. In response, the storage element 404 provides N-$K_{best}$ recovered decoded macroblocks, and the error concealment element 406 provides $K_{best}$ concealed macroblocks. These macroblocks of texture data may be combined to produce a best set of macroblocks of texture data to replace the corrupted video packet.

There has been disclosed herein embodiments for error concealment of video data using texture data recovery. In one embodiment, the corrupted macroblocks may be concealed by motion compensated temporal replacement. To find an appropriate number of macroblocks to conceal, macroblock boundary smoothness is evaluated for varying number of macroblocks of utilized texture information. Thus, the final number of macroblocks of utilized decoded texture information (the recovered information) is selected to maximize overall boundary smoothness.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, error concealment may use a process other than the motion compensated temporal replacement. Moreover, the present embodiments may be used to process video data having a texture data unit other than a macroblock. Further, the methods of the present embodiments may be programmed as a software on a computer readable medium, such as a floppy disk or a CD-ROM disk. In other instances, well-known structures and functions were not described in elaborate detail in order to avoid obscuring the subject matter of the present invention. Accordingly, the scope and spirit of the invention should be judged in terms of the claims which follow.

What is claimed is:

1. A method for concealing errors in texture partition of a video packet, comprising:
   determining a particular macroblock within the texture partition where error is detected;
   concealing the error starting at the particular macroblock;
   evaluating image smoothness of concealed macroblocks;
   repeating said concealing and evaluating with one more macroblock added prior to the previous particular macroblock such that the concealing and evaluating is done on the combination of the one more macroblock and the previous particular macroblock, said repeating done by successively adding one more macroblock to the combination until all macroblocks in the texture partition have been concealed; and
   selecting a set of macroblocks, including a combination of decoded and concealed macroblocks, that produces best image smoothness.

2. The method of claim 1, further comprising:
   storing all decoded macroblocks of texture data in the texture partition up to the particular macroblock.

3. The method of claim 2, wherein said detecting includes DCT coefficient counts greater than a predetermined amount of approximately 64 pixels for a macroblock and Y/Cr/Cb pixel values out of range.

4. The method of claim 2, wherein said selecting a set of macroblocks includes recovering some of the stored decoded macroblocks.

5. The method of claim 4, wherein said seine of the stored decoded macroblocks include decoded macroblocks up to a macroblock that produced the best image smoothness.

6. The method of claim 1, wherein said concealing the error starting at the particular macroblock includes performing motion compensated temporal replacements of macroblocks starting at the particular macroblock.

7. The method of claim 6, wherein said performing motion compensated temporal replacements is done for those macroblocks whose motion vectors have changed.

8. The method of claim 1, wherein said evaluating image smoothness of concealed macroblocks includes computing smoothness of macroblock boundaries.

9. The method of claim 8, wherein said smoothness of macroblock boundaries is measured by summing pixel value mismatches between macroblock boundary pixels.

10. The method of claim 9, wherein said summing pixel value mismatches includes storing partial mismatch values.

11. The method of claim 9, wherein said summing pixel value mismatches includes summing squares of the pixel value differences.

12. The method of claim 9, wherein said pixel value mismatches are computed by reusing the partial mismatch values from previous iteration.

13. The method of claim 1, further comprising:
    detecting the error in the video packet.

14. The method of claim 13, wherein said detecting includes detecting invalid variable length code.

15. The method of claim 13, wherein said detecting includes detecting inconsistent resynchronization header information.

16. The method of claim 13, wherein said detecting includes detecting receipt of out-of-range motion vectors.

17. A method for concealing errors in texture partition of a video packet, comprising:
    determining a particular macroblock within the texture partition where error is detected;
    concealing the error starting at the particular macroblock;
    evaluating image smoothness of concealed macroblocks;
    repeating said concealing and evaluating with one more macroblock added prior to the previous particular macroblock, said repeating done until all macroblocks in the texture partition have been concealed; and
    selecting a set of macroblocks, including a combination of decoded and concealed macroblocks, that produces best image smoothness, wherein pixel value mismatches between macroblocks belonging to different video packets are weighed differently from each other, differences in weighing depending on differences in desired quality of video frames.

18. The method of claim 17, wherein the pixel value mismatches between macroblocks that belong to different video packets are configured to weigh more than the pixel value mismatches between macroblocks that belong to same video packets.

19. A method for concealing errors in texture partition of a video packet, comprising:
    determining a particular location within the texture partition where error is detected;
    concealing the error in texture data starting at the particular location;
    evaluating image smoothness of the concealed texture data at least in part by assigning first weights to pixel value mismatches between macroblocks in a first video data structures and assigning second weights to pixel value mismatches between macroblocks in a second video data structure, the first and second weights not being identical to each other and each being established based at least in part on a respective desired quality of video decoded from the respective video data structure;
    repeating said concealing and evaluating with one more texture data unit added prior to the previous particular location, said repeating done until all texture data units in the texture partition have been concealed; and
    selecting a set of texture data units, including a combination of decoded aid concealed texture data units, that produces best image smoothness.

20. The method of claim 19, wherein said concealing the error in the texture data starting at the particular location includes performing motion compensated temporal replacements of texture data units starting at the particular location.

21. An error concealment system for texture partition of a video packet, comprising:
- an error location detector to receive video packets, and determine a particular macroblock within the texture partition where error is detected;
- an error concealment element to conceal the error starting at the particular macroblocking;
- an image smoothness evaluator to evaluate the concealed macroblocks, the evaluator at least in part summing squares of element value differences in a manner that weighs element value mismatches between macroblocks belonging to different video packets differently based at least in part on different desired qualities of video;
- a selector to select a set of macroblocks, including a combination of decoded and concealed macroblocks, that produces best image smoothness.

22. The system of claim 21, wherein said error concealment element includes a motion compensated temporal replacement element.

23. The system of claim 21, further comprising:
- a storage element to store all decoded macroblocks of texture data in the texture partition up to the particular macroblock.

24. A computer readable medium containing executable instructions which, when executed in a processing system, causes the system to conceal errors in texture partition of a video packet, comprising:
- determining a particular macroblock within the texture partition where error is detected;
- concealing the error starting at the particular macroblock;
- evaluating image smoothness of concealed macroblocks;
- repeating said concealing anti evaluating with one more macroblock added prior to the previous particular macroblock, the concealing and evaluating being done on the combination of the one more macroblock and the previous particular macroblock, said repeating done by successively adding one more macroblock to the combination until all macroblocks in the texture partition have been concealed; and
- selecting a set of macroblocks, including a combination of decoded and concealed macroblocks, that produces best image smoothness.

25. The computer readable medium of claim 24, further comprising:
- storing all decoded macroblocks of texture data in the texture partition up to the particular macroblock.

26. The computer readable medium of claim 24, wherein the evaluating instruction includes summing squares of pixel value differences that weighs the pixel value mismatches between macroblocks belonging to different video packets differently.

* * * * *